Dec. 5, 1961 T. WIRTH ET AL 3,011,458
RAILWAY VEHICLE
Filed Nov. 24, 1958 3 Sheets-Sheet 1

INVENTORS:
THOMAS WIRTH
HEINZ KUNSCHER.
BY MICHAEL S. STRIKER
ATTORNEY.

INVENTORS:
THOMAS WIRTH
HEINZ KUNSCHER
BY MICHAEL S. STRIKER
ATTORNEY

Dec. 5, 1961 T. WIRTH ET AL 3,011,458
RAILWAY VEHICLE

Filed Nov. 24, 1958 3 Sheets-Sheet 3

INVENTORS:
THOMAS WIRTH.
HEINZ KUNSCHER.
BY MICHAEL S. STRIKER.
ATTORNEY

United States Patent Office 3,011,458
Patented Dec. 5, 1961

3,011,458
RAILWAY VEHICLE
Thomas Wirth, Dachau, and Heinz Kunscher, Munich-Obermenzing, Germany, assignors to Krauss-Maffei Aktiengesellschaft, Munich-Allach, Germany
Filed Nov. 24, 1958, Ser. No. 775,943
13 Claims. (Cl. 105—196)

The present invention relates to railway vehicles.

Railway vehicles conventionally include a vehicle body and a pair of trucks located beneath the ends of the vehicle body to support the latter. These trucks have a plurality of axles and wheels carried thereby. For relatively light railway cars a pair of wheel assemblies are provided for each truck. However, where the axles are required to carry relatively large loads, particularly in locomotives driven by diesel engines through hydraulic or mechanical and hydraulic transmissions, three wheel assemblies are provided in order to reduce the load required to be carried by each axle. Particular problems arise with trucks which have three wheel assemblies. The wheel base is extremely long and the frame of the truck is relatively large in order to have the desired strength, so that it is difficult to arrange all of the parts, such as the various articulated transmission shafts, the brakes, etc. because of the little space which is available for this purpose, and the structure is subject to considerable wear and does not operate in the desired manner.

It is an object of the present invention to provide a railway truck having three wheel assemblies capable of being driven, this railway truck having a relatively short wheel base and a relatively light frame so that it is relatively simple to obtain the required space for all of the other elements such as the transmission shafts, the brakes, the bearings, etc.

It is also an object of the present invention to provide a railway truck of the above type which is capable of absorbing forces in all directions and in which the forces which are absorbed and which extend in various directions are separated from each other so that the structure which absorbs the longitudinal forces, for example, will not also be required to absorb transverse forces.

A further object of the present invention is to provide a railway truck of the above type having a spring arrangement which is capable of efficiently absorbing vertical forces as well as supporting a part of a vehicle body on the truck.

An additional object of the present invention is to provide a railway truck of the above type whose wheels are capable of being driven by a locomotive supported by the truck and whose three axles will be substantially uniformly loaded even when the vehicle starts to move.

The object of the present invention also includes the provision of a railway truck having three wheel assemblies which is superior to conventional railway trucks having two wheel assemblies.

With the above objects in view the present invention includes in a railway vehicle a vehicle body and an elongated truck frame means extending at least in part beneath the vehicle body and having a longitudinal axis of symmetry extending in a direction of travel of the vehicle. A lever means is operatively connected to the frame means and to the vehicle body for transmitting between the frame means and the vehicle body forces directed transversely with respect to the frame means. A transverse plate means is connected to the frame means and vehicle body and extends transversely of the longitudinal axis of the frame means for transmitting longitudinal forces between the frame means and the vehicle body. A pair of end wheel assemblies and an intermediate wheel assembly is located therebetween to form the three wheel assemblies of the truck. A link means is pivotally connected at one end to each of the end wheel assemblies and at an opposite end to the frame means for linking the end wheel assemblies to the frame means and for resisting longitudinal and transverse forces between the end wheel assemblies and the frame means. A guide means is carried by and cooperates with the intermediate wheel assembly and the frame means for connecting the latter wheel assembly to the frame means while providing slidable engagement between the frame means and the intermediate wheel assembly. A relatively hard primary spring means supports the frame means on the wheel assemblies, and a relatively soft secondary spring means supports the vehicle body on the frame means. A plurality of drives are respectively connected with the axles of the three wheel assemblies, and a torsion-resistant means respectively connects these drives to the frame means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
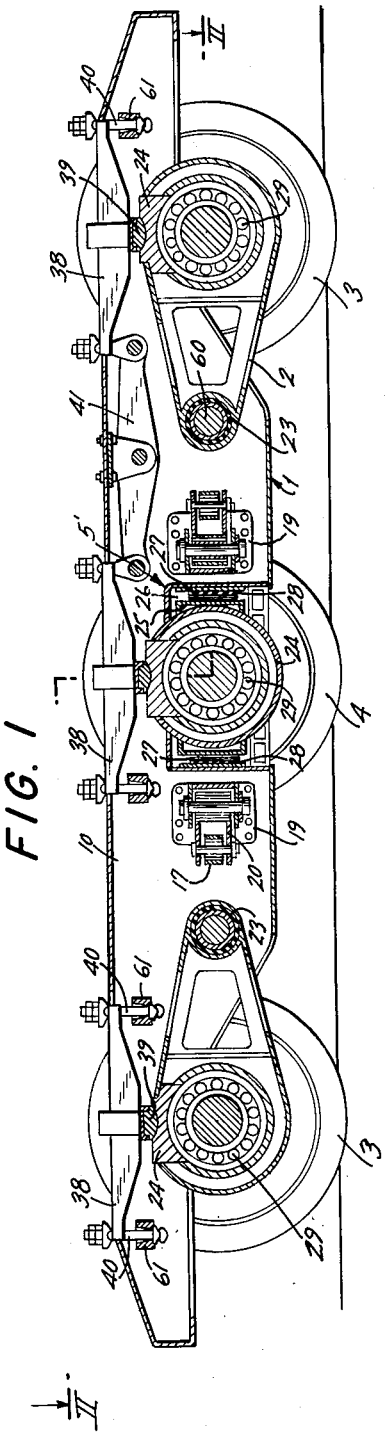
FIG. 1 is a longitudinal sectional elevation of a railway truck according to the present invention, the section of FIG. 1 being taken along line I—I of FIG. 2 in the direction of the arrows.

In the example of the invention which is illustrated in the drawings, the railway truck is capable of being swiveled with respect to the vehicle body which it supports and this vehicle body is in the form of a diesel-hydraulic locomotive which drives the axles of the wheel assemblies of the truck. This truck includes an elongated frame means 1 made up of a plurality of relatively stiff sheets of metal which are welded together to form the truck frame. The truck includes in addition to the elongated frame means 1 the link means 2 which links the axles of the end wheel assemblies 3 to the frame means 1, and the guide means which connects the intermediate wheel assembly 4 to the frame means 1 while providing slidable movement of the frame means 1 and the intermediate wheel assembly 4 relative to each other. The drives for the several axles of the three wheel assemblies includes the transmissions 6 which are respectively connected to the frame means 1 by torsion-resistant means 5, and a lever means 7 interconnects the vehicle body with the frame means for resisting forces extending transversely of the longitudinal frame means, a plate means 8, 9 being operatively connected with the vehicle body and the frame means for absorbing longitudinal forces therebetween. Also, the structure of the invention includes a primary and a secondary spring means for supporting the frame means on the wheel assemblies, on the one hand, and the vehicle body on the frame means, on the other hand, respectively.

Figure 2:
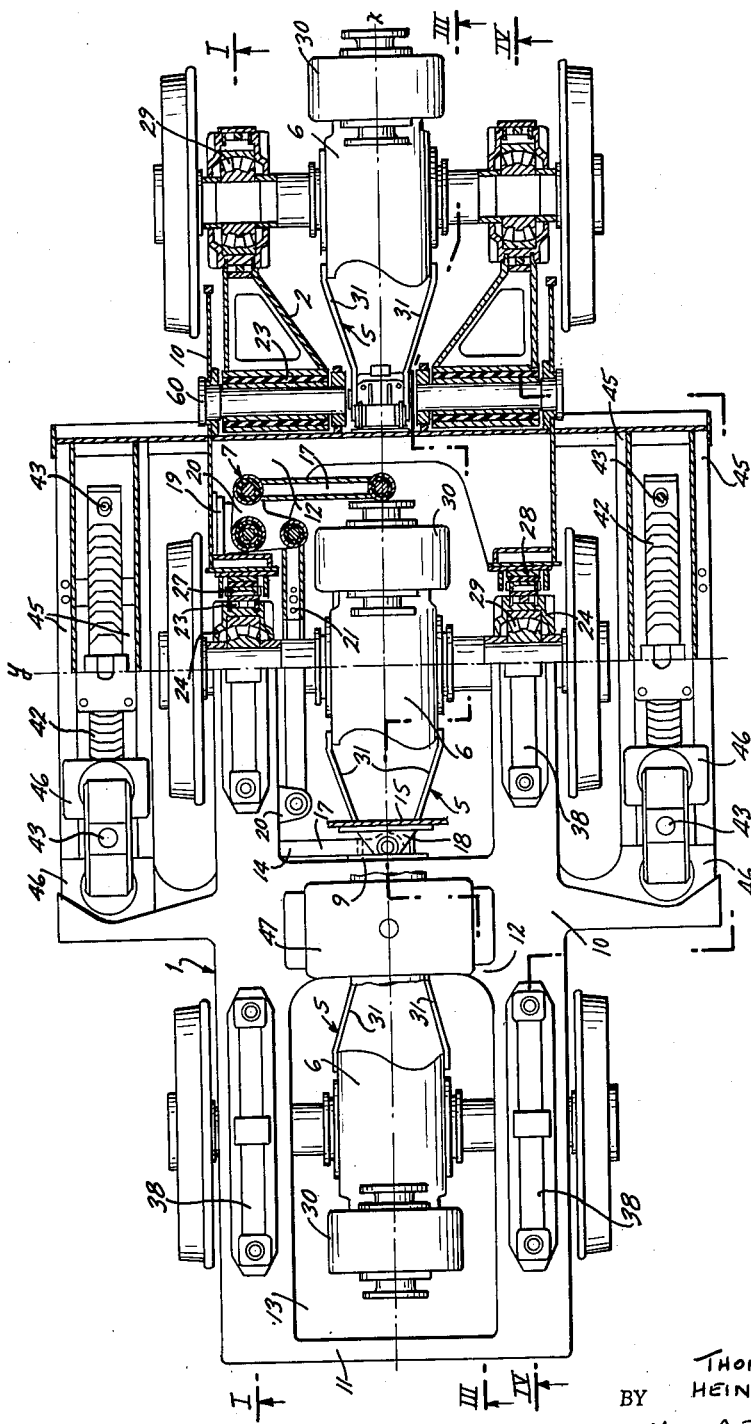
FIG. 2 is a top plan view of the truck of the invention taken along line II—II of FIG. 1 in the direction of the arrows, the right half of FIG. 2 being in section.

The elongated frame means 1 has a longitudinal axis of symmetry $x$ shown in FIG. 2 which extends in the direction of travel of the vehicle, and this frame means includes a transverse axis $y$ also shown in FIG. 2, extending transversely through the center of the truck. The several plates of the frame means 1 are welded together so as to form a substantially hollow frame, and this frame includes a pair of opposed parallel longitudinal side portions 10 and a plurality of transverse portions extending between and connected with the side portions 10. Thus, at the end of the frame means there are a pair of transverse portions 11 interconnecting the side portions 10, and between the axles of the end wheel assemblies 3 there are a pair of transverse portions 12 which also interconnect the side portions 10. In this way the frame means includes three openings extending vertically through the frame means and arranged symmetrically with respect to the longitudinal axis $x$ thereof. Thus, there are a pair of openings 13 located over the axles of the end wheel assembly 3 and an intermediate opening 14 located between the openings 13 over the axle of the intermediate wheel assembly 4. The transverse axis $y$ is symmetrically arranged with respect to the central opening 14 which extends downwardly through the frame means 1.

Figure 3:
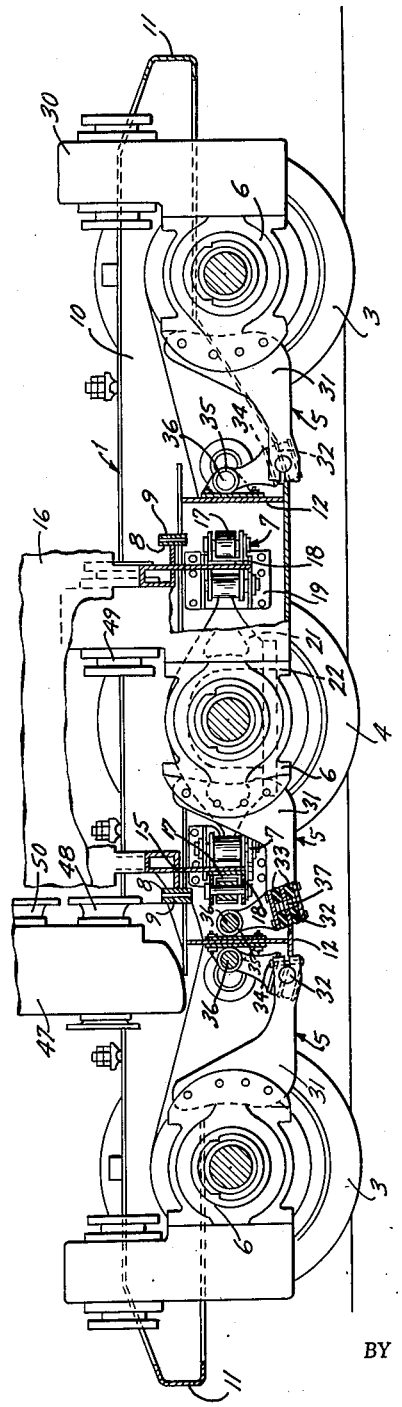
FIG. 3 is a longitudinal sectional elevational view taken along line III—III of FIG. 2 in the direction of the arrows and showing part of a vehicle body which cooperates with the truck of the invention.

As may be seen from the FIG. 3, a vehicle body 16 is fragmentarily shown, this vehicle body 16 forming part of a locomotive as described above, and the vehicle body 16 includes a box-shaped projection 15 extending downwardly from the vehicle body 16 with substantial clearance into the opening 14 of the frame means 1. This projection 15 of the vehicle body is centrally arranged with respect to the opening 14.

The projection 15 has a pair of front and rear wall portions extending transversely of the frame means 1, and each of these wall portions of the projection 15 of the vehicle body fixedly carries a plate 8 (FIG. 3). The pair of transverse portions 12 of the frame means 1 respectively carry a pair of transverse wall portions 9 located next to the wall portions 8 and with the plates 8 located between the plates 9, as shown in FIG. 3. Thus, the plates 8 which are carried by the vehicle body are located between and directed toward the plates 9 which are carried by the frame means 1. These plates 8 and 9 are preferably made of wear-resistant material such as, for example, austenitic manganese steel. The plates 8 which are connected with the vehicle body form part of a sphere, so that unhindered movement of the vehicle body 16 in all directions with respect to the frame 1 is guaranteed. The plates 8 and 9 serve to transmit longitudinal forces between the frames means 1 and the vehicle body 16.

The lever means 7 connected to the vehicle body 16 and the frame means 1 for transmitting transverse forces therebetween includes a pair of links 17 (FIG. 2) extending transversely of the vehicle body 1. These links 17 each have an end located in the vertical plane which includes the longitudinal axis $x$ shown in FIGURE 2. At these ends the links 17 are pivotally connected to brackets 18, respectively, for turning movement about a pair of parallel vertical axes which are perpendicular to the longitudinal axis $x$, and the brackets 18 are screwed or otherwise fixed with the front and rear transverse walls of the projection 15 of the vehicle body 16, the brackets 18 and links 17 being located beneath the plates 8, as is particularly evident from FIG. 3. The lever means 7 further includes a pair of bell cranks 20 located to one side of the vertical plane which includes the longitudinal axis $x$, as is indicated most clearly in FIG. 2. The bell cranks 20 are symmetrically arranged with respect to the transverse axis $y$, and each bell crank is pivotally supported by a bracket 19 fixed to the side wall of the frame 1 which is illustrated at the upper portion of FIG. 2. The bell cranks 20 are also supported for turning movement about a pair of vertical axes, respectively, and each bell crank has an arm extending longitudinally of the vehicle and a second arm extending transversely of the frame 1 toward the central longitudinal axis $x$ thereof. The longitudinal arms of the bell cranks extend from the turning axes thereof away from each other toward the ends of the frame 1, and the ends of links 17 which are distant from the brackets 18 are pivotally connected with the ends of the longitudinally extending arms of the bell cranks 20. A link means 21 interconnects the transversely extending arms of the bell cranks 20, and this link means 21 is subjected to tensile and compressive forces during operation of the lever means 7 in transmitting transverse forces between the vehicle body 16 and the frame 1. The link means 21 is formed with a cutout through which the axle of the intermediate wheel assembly 4 extends with substantial clearance. For this purpose the link means 21 is provided intermediate its ends with a substantially U-shaped portion shown most clearly in FIG. 3 straddling the axle of the intermediate wheel assembly 4, this U-shaped portion of the link means 21 being open at its bottom, and a strap 22 bridges the open end of the U-shaped portion of the link means 21 and is bolted to the link means 21 at the free ends of the legs of the U-shaped portion thereof, so that the U-shaped portion of the link means 21 and the strap 22 define the opening of the link means 21 through which the axle of the intermediate wheel assembly 4 extends with substantial clearance, as is evident from FIG. 3. As is evident from FIGS. 1 and 3, the lever means 7 is located at the same elevation as the axles of the wheel assemblies 3 and 4. All of the bearings which interconnect the elements of the lever means 7 have a limited degree of free play and may take the form of bearings known as Silentblocs which include inner and outer metal sleeves spaced from each other and having a compressed rubber sleeve therebetween.

Figure 4:
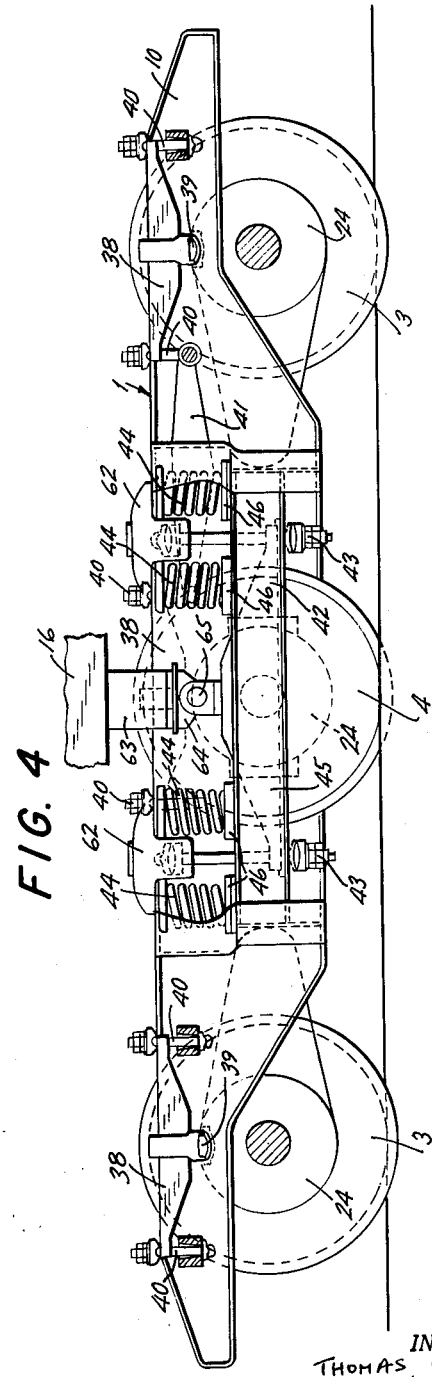
FIG. 4 is a partly sectional longitudinal side elevation of the structure of the invention illustrating the spring structure of the invention, the details of the bearings being omitted from FIG. 4 for the sake of clarity, FIG. 4 being taken along line IV—IV of FIG. 2 in the direction of the arrows.

As may be seen from FIGS. 1, 3 and 4 the ends of the frame means 1 extend over the axles of the end wheel assemblies 3, and furthermore, as may be seen from FIG. 2, the frame means 1 extends between the wheels of the end wheel assemblies 3. The link means 2 which link the axle of each wheel assembly to the frame 1 is shown most clearly in FIGS. 1 and 2. Thus, each link 2 is fixed with a self-aligning bearing 29 through which the axle of the end wheel assembly passes and this self-aligning bearing 29 pivotally connects the link 2 to the axle. It will be noted that a pair of links 2 are connected through a pair of self-aligning roller bearings 29 with each axle of each end wheel assembly 3 and the pairs of links 2 respectively connected with the end wheel assemblies extend from the latter toward each other. The frame 1 includes side walls to which shafts 60 are fixed. Thus, as may be seen from FIG. 2, a pair of these shafts 60 extend coaxially toward each other from the opposite outer side walls of the frame 1, and at their inner ends the shafts 60 are supported by brackets fixed to the transverse portion 12 of the frame means 1. These shafts 60 respectively pass through bearings 23 which are connected to the inner ends of the links 2. The bearings 23 are in the form of Silentblocs and thus include inner and outer sleeves with a pre-compressed rubber sleeve therebetween. As may be seen from FIGS. 1 and 2, each of the links 2 is of considerable breadth and considerable depth, so that these links 2 are capable of resisting the longitudinal and transverse forces transmitted between the end wheel assemblies and the frame 1. As may be seen from FIG. 2 the left ends of the links 2 connected to the right end wheel assembly of FIG. 2 extend almost completely across the frame means 1. The links 2 which are connected to the left end wheel assembly of FIGS. 1 and 2 are identical with and symmetrically arranged with respect to the links 2 connected head ends of the bolts engage the bottom faces of the eyes 61 which are fixed to the frame means 1, and the top threaded ends of the bolts are located upwardly beyond the leaf springs 38 and carry the nuts and washers which serve to adjust the length of the bolts. As may be seen from FIG. 1 the pair of leaf spring groups 38 which cooperate with the left wheel assembly of FIG. 1 have the ends thereof connected through the bolt and nut assemblies 40 and the eyes 61 directly to the frame means 1. However, it will be seen that while the right end of the right groups of leaf springs 38 are connected with the frame 1 through the bolt and nut assemblies and the eyes 61, the left ends of the pair of leaf spring assemblies which cooperate with the right wheel assembly 3 of FIG. 1 are connected with links which are pivotally connected to the right ends of levers 41 which are pivotally supported intermediate their ends by the frame 1. The left ends of the levers 41 (see in FIG. 1) are connected with the right ends of the leaf spring assemblies 38 which cooperate with the intermediate wheel assembly 4, the left ends of these leaf spring assemblies 38 being connected directly to the frame 1 through the bolt and nut assemblies 40 and the eyes 61. As is evident from FIG. 4, the spring structure shown at one side of the truck in FIG. 1 is repeated at the other side of the truck. Thus, the levers 41 serve to equalize the stressing of the spring assemblies 38 associated with the intermediate wheel assembly 4 with the stressing of the spring assemblies 38 associated with one of the end wheel assemblies 3.

A softer secondary spring means which acts over a larger area is provided for supporting the body 16 of the vehicle on the frame 1. Thus, the primary spring means serves to suspend the frame 1 on the wheel assmblies, the eyes 61 which are fixed to the frame means 1 pulling downwardly on the bolt and nut assemblies 40 to cause the spring assemblies 38 to support the frame means 1, and the frame means 1 carries the secondary spring means on which the vehicle body is supported. The frame means 1 is provided between the end wheel assemblies 3 with a pair of laterally projecting portions which respectively project laterally beyond the side portions 10 of the frame means 1. Each of these laterally projecting portions of the frame means includes a pair of parallel spaced walls 45 extending longitudially of the truck and located beyond the side portions 10 of the frame means 1, as is shown most clearly in FIG. 2. Between each pair of parrllel spaced wall portions 45 is located a leaf spring assembly 42. The ends of the leaf spring assembly 42 are respctively formed with openings through which bolt and nut assemblies 43 extend in a manner shown in FIGS. 2 and 4, and it will be noted from FIG. 4 that the ends of the leaf spring assemblies 42 rest on washers which in turn rest on nuts carried by the bolt and nut assemblies 43. The bolts of these assemblies extend upwardly from the ends of the spring assemblies through the spaces between the walls 45 to an elevation higher than the latter, and at their top ends the bolt and nut assemblies are respectively fixed to T-shaped members 62 shown most clearly in FIG. 4. Each T-member 62 is located between a pair of coil springs 44, and the projecting ends of each T-member 62 presses downwardly against the top ends of the associated pair of coil springs. The bottom ends of the coil springs 44 respectively rest on plates 46 which rest in turn on the walls 45, bridging the space therebetween, and any suitable screw members may be provided to fix the plates 46 to the frame means 1 in a position bridging the walls 45. As is particularly evident from FIG. 4, the vehicle body 16 has at opposite sides a downwardly extending projection 63 formed with a bore extending upwardly into the same from the bottom end thereof, and a member 64 has at its top end a pin extending turnably into the bore of the member 63, this member 64 being pivotally connected at 65 to the shackle which holds together the several leaf springs of each leaf spring assembly 45. Thus, the parts 63-65 form a universal joint serving to connect the body 16 with each leaf spring 42, and with this construction the vehicle body 16 is directly supported by the pair of leaf spring assemblies 42 respectively located at the opposite sides of the frame means 1, these leaf spring assemblies 42 being themselves carried by the coil springs 44 which are in turn caried by the frame means 1. It will be seen from FIG. 4 that the portions 45 of the frame means 1 as well as the leaf spring assemblies 42 located therebetween are located at the same elevation as the axles of the wheel assemblies 3 and 4. Moreover, as may be seen from FIG. 2, the frame means 1 includes between the side portions 10 thereof and the pairs of walls 45 openings through which the wheels of the intermediate wheel assembly 4 freely project. The secondary spring means may operate progressively as by providing, for example, stop members which limit the compression of the coil springs 44, and in this way the extent to which the body 16 and truck can tilt with respect to each other may be reduced.

The left transverse portion 12 of the frame means 1, as viewed in FIGS. 2 and 3, carries an intermediate transmission 47 having an output shaft 48 extending beyond its left and right ends, as viewed in FIG. 3, and the ends of the output shaft 48 are respectively connected with the input drive shafts of the transmissions 30 which are respectively connected with the bevel gear transmissions 6 carried by the axles of the intermediate wheel assembly 4 and the left end wheel assembly 3, as viewed in the drawings. The transmission from the output shaft 48 of the transmission 47 to the input shafts of the transmissions 30 is provided by elongated shafts each of which includes a plurality of sections interconnected with each other by universal joints, these shaft transmissions not being shown in the drawings for the sake of clarity. The vehicle body 16 and its bottom projection 15 are formed with suitable cutouts permitting the articulated drive shaft to extend from the shaft 48 to the input shaft 49 of the transmission 30 connected with the transmission 6 of the intermediate wheel assembly 4. It will be noted that the drive shafts 49 for the transmissions 30 extend beyond the opposite ends of the transmissions 30, and the right end of the drive shaft 49 of the intermediate transmission 30 of FIG. 3 is connected through an unillustrated articulated shaft to the input shaft of the transmission 30 connected with the bevel gear transmission 6 of the right end wheel assembly 3 of FIG. 3. In this way the drive is transmitted from the transmission 47 to all of the transmissions 30 so that from the latter the drive is transmitted through the bevel gear drives 6, respectively, to the axles of all of the wheel assemblies. The prime mover carried by the vehicle body 16 has its output shaft connected with the input shaft 50 of the transmission 47 through an unillustrated articulated shaft, and the universal joints of this latter shaft are symmetrically arranged with respect to the theoretical ideal vertical turning axis of the body 16 and truck 1 with respect to each other, this latter axis passing vertically through the axis of the axle of the intermediate wheel assembly 4 at the center of the latter axle. Of course, with the structure of the invention there is no central pivot which interconnects the vehicle body 16 and the truck. The body 16 is carried by the springs 42 and the plates 8 have a spherical configuration and form part of the same sphere so that the truck and vehicle body are free to turn one with respect to the other, but there is no pivot at the center of the truck connecting the latter with the vehicle body.

Tests have proved that the above-described swivel-truck of the invention has operating properties which are in every way superior to those of trucks having only a pair of wheel assemblies. Throughout the entire range of speeds of the locomotive there are no resonant vibrations. The traveling of the truck of the invention along straight rails as well as along curves takes place faultlessly in an to the right end wheel assembly 3 of FIGS. 1 and 2. With this construction the connection of the end wheel assemblies with the frame means 1 requires a minimum amount of maintenance and is extremely resistant to wear.

As was pointed out above, a guide means 51 is provided for interconnecting the frame means 1 with the intermediate wheel assembly 4 while providing slidable movement of the frame means and intermediate wheel assembly with respect to each other. As may be seen from FIGS. 1 and 2 each end portion of the axle of the intermediate wheel assembly extends through a self-aligning roller bearing 29 of the same construction as those associated with the axles of the end wheel assemblies. The pair of self-aligning roller bearings 29 of the intermediate wheel assembly are respectively located in a pair of housings 24, and each housing 24 has a pair of slide plates 25 fixed to its front and rear ends, as shown in FIGS. 1 and 2. The frame means 1 is provided with walls which form a space 26 (FIG. 1) into which the slide plates 25 project. These slide plates 25 respectively bear slidably against vertical slide plates 27 which are parallel to the end walls of the slide plates 25 and which are carried by the frame means 1. The guide means 5' formed by slide plates 25, 27 and connected to the intermediate wheel assembly 4 and the frame means 1 provides the usual longitudinal and transverse play of a slidable guide means for an axle of a wheel assembly, and the plates 25 and 27 are preferably made of or provided with a coating of austenitic manganese steel so that there is a minimum amount of maintenance and wear. The plates 27 which are located in the hollow portion 26 of the frame 1 are not connected directly with the latter. They are connected with rubber inserts 28 which are in turn connected with the frame 1 at the housing portion 26 thereof, and these inserts 28 have the same spring characteristics as the rubber inserts of the bearings 23 which connect the links 2 with the frame 1. As a result, all three wheel assemblies will be loaded to the same extent when the vehicle starts to move.

It will be noted that the self-aligning roller bearings 29 are carried by all of the axles between the wheels of the wheel assemblies and that the frame 1 extends between the wheels of the end wheel assemblies, as was pointed out above. As a result, the size of the frame 1 is relatively small and it is therefore correspondingly light. The use of self-aligning roller bearings 29 on the axles of the wheel assemblies provides unhindered tilting movement of these wheel assemblies when, for example, one side of the truck is lower than the other.

Each of the axles of the wheel assemblies 3 and 4 is driven by a bevel gear transmission 6, and each bevel gear transmission 6 is driven by a spur gear transmission 30. Only the housings of these transmissions are illustrated in the drawings, and the axle of each wheel assembly passes through the housing of the bevel gear transmission 6. The housings of these transmissions 6 are connected to the frame means 1 by a torsion-resistant means 5. As is shown most clearly in FIGS. 2 and 3, each torsion-resistant means 5 includes a pair of plates 31 which are made of a springy metal and which are bolted to a housing of a transmission 6. Thus, the plates 31 of the right torsion-resistant means 5 of FIGS. 2 and 3 are bolted to the housing of the transmission 6 which is operatively connected with the axle of the right wheel assembly 3 of FIGS. 2 and 3. The pair of plates 31 extend longitudinally of the frame means 1 and each pair of plates 31 is fixed as by welding, for example, at its free ends distant from the transmission housing to an intermediate plate 32 extending between the pair of plates 31 of each torsion-resistant means 5. The latter includes a pair of springy rubber annular elements 33 respectively located against the opposite faces of each intermediate plate 32, and the rubber elements 33 are located in a housing 34 and which extends between the plates 31 and houses the intermediate plate 32 as well as the rubber elements 33. Each housing 34 is formed by a pair of plates engaging the outer faces of the elements 33 which are directed away from the plate 32, and the pair of plates which engage the outer faces of the element 33 are interconnected with each other by bolts extending between the corners thereof, so that the housing 34 is relatively open and actually serves only as a means for holding the rings 33 against the plate 32, the plate 32 being sandwiched between the rings 33 and the latter being sandwiched between the plates of the housing 34. The upper plate of each housing 34 is connected with a bearing 35. Thus, a pair of upwardly directed plates are fixed to the upper plate of each housing 34 and extend upwardly therefrom to a sleeve which surrounds a pivot pin 36 of the bearing means 35, the pivot pin 36 being carried by a bracket fixed to a transverse portion 12 of the frame 1. These pivot bolts 36 extend horizontally, are symmetrically arranged with respect to the longitudinal central axis $x$, and are located at the same elevation as the shafts 60 which connect the links 2 to the frame means 1. As may be seen from FIG. 3, the right torsion-resistant means 5 interconnects the transmission 6 of the right end wheel assembly 3 with the right transverse portion 12 of the frame means 1, while the pair of torsion-resistant means 5 connected to the transmissions 6 of the remaining two wheel assemblies are connected to the left transverse portion 12 at a vertical wall thereof and at opposite faces of this vertical wall, as is evident from FIG. 3.

As is shown particularly at the left torsion-resistant means 5 of FIG. 3, instead of being welded or otherwise fixedly connected to the pair of plates 31, the plate 32 can be adjustably connected thereto. Thus, the plate 32 may have at its outer side edges a pair of pins fixed thereto and surrounded by a pair of portions of each plate 31 which may be drawn together by a bolt so as to clamp the pin, and in this way each plate 32 can be fixed to the pair of plates 31 at an adjusted, preselected inclination. In order to prevent overloading of the rubber elements 33, each intermediate plate 32 is provided at its opposite faces with a pair of pins 37 extending into the central openings of the pair of rings 33, these pins 37 acting as stops and cooperating with the upper and lower plates of each housing 34, respectively, to limit the extent to which the rings 33 are stressed.

The truck of the invention includes a relatively hard primary spring means acting on a relatively small area for supporting the frame 1 on the wheel assemblies 3 and 4. The primary spring means is made up of a plurality of groups of relatively hard leaf springs 38 and the structure which cooperates with the several groups of leaf springs 38. Each of the self-aligning roller bearings 29 is located in a housing 24, and a pair of such bearings and housings are located on the axle of each wheel assembly adjacent to the wheels thereof. The groups of leaf springs 38 are respectively arranged over the housings 24, so that there are six groups of leaf springs 38 respectively located over the six housings 24. The leaf springs of each group are held together by a shackle, and each of these shackles has a downwardly extending projection 39 having a bottom face which forms part of a sphere, and this projection 39 extends into a recess formed in the top face of each housing 24, this recess also forming part of a sphere, so that, as is most clearly shown in FIG. 1, the several groups of leaf springs 38 are carried by the housings 24 while being tiltable with respect to these housings. As may be seen from FIG. 1, the ends of each group of leaf springs 38 are respectively connected to bolt and nut assemblies 40 so that the length of each assembly 40 can be regulated. The bolt and nut assemblies 40 are also indicated in FIG. 4. The side walls of the frame 1 which form part of the longitudinal portions 10 thereof fixedly carry the eyes 61 through which the bolt and nut assemblies 40 respectively pass. The easy, unforced manner. The structure of the invention requires a minimum amount of maintenance and has a minimum wear in its parts. The structure of the invention is of relatively light weight, has a relatively short wheel base, the springing characteristics are excellent, and there is plenty of room for all of the drives, the articulated shafts, the brakes, and the like, and there is a faultless separation of the various forces which act in different directions.

It will be understood that each of the elements described above, or two or more together, may also find a useful application in other types of railway trucks differing from the types described above.

While the invention has been illustrated and described as embodied in railway trucks having three wheel assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a railway vehicle, in combination; elongated truck frame means adapted to extend at least in part beneath a body of said vehicle and having a longitudinal axis of symmetry extending in the direction of travel of the vehicle; lever means operatively connected to said frame means and adapted to be connected to the vehicle body for transmitting between the frame and vehicle body forces directed transversely with respect to said frame; transverse plate means connected to said frame and adapted to be connected to the vehicle body transversely of the longitudinal axis of said frame for transmitting longitudinal forces between the frame and vehicle body; a pair of end wheel assemblies and an intermediate wheel assembly located therebetween; link means pivotally connected at one end to each end wheel assembly and at an opposite end to said frame for linking said wheel assemblies to said frame and for resisting longitudinal and transverse forces between the end wheel assemblies and said frame; guide means carried by and cooperating with said intermediate wheel assembly and said frame for connecting the latter wheel assembly to said frame while providing slidable engagement between said frame and intermediate wheel assembly; a plurality of relatively hard primary spring means associated with each of said wheel assemblies and supporting said frame on said wheel assemblies, respectively; and relatively soft secondary spring means connected to said frame and adapted to support the body on said frame, said secondary spring means being located in the region of said intermediate wheel assembly and being laterally spaced from said longitudinal axis farther than said primary spring means.

2. In a railway vehicle, in combination; elongated truck frame means adapted to extend at least in part beneath a body of said vehicle and having a longitudinal axis of symmetry extending in the direction of travel of the vehicle; lever means operatively connected to said frame means and adapted to be connected to the vehicle body for transmitting between the frame and vehicle body forces directed transversely with respect to said frame; transverse plate means connected to said frame and adapted to be connected to the vehicle body transversely of the longitudinal axis of said frame for transmitting longitudinal forces between the frame and vehicle body; a pair of end wheel assemblies and an intermediate wheel assembly located therebetween; link means pivotally connected at one end to each end wheel assembly and at an opposite end to said frame for linking said wheel assemblies to said frame and for resisting longitudinal and transverse forces between the end wheel assemblies and said frame; guide means carried by and cooperating with said intermediate wheel assembly and said frame for connecting the latter wheel assembly to said frame while providing slidable engagement between said frame and intermediate wheel assembly; a plurality of relatively hard primary spring means associated with each of said wheel assemblies and supporting said frame on said wheel assemblies, respectively; relatively soft secondary spring means connected to said frame and adapted to support the body on said frame, said secondary spring means being located in the region of said intermediate wheel assembly and being laterally spaced from said longitudinal axis farther than said primary spring means; and means connecting each wheel assembly to said frame for resisting turning of said wheel assembly with respect to said frame and including a spring unit pivotally carried by said frame for turning movement about a horizontal axis extending transversely of the frame.

3. In a railway vehicle, in combination; elongated truck frame means adapted to extend at least in part beneath a body of said vehicle and having a longitudinal axis of symmetry extending in the direction of travel of the vehicle; lever means operatively connected to said frame means and adapted to be connected to the vehicle body for transmitting between the frame and vehicle body forces directed transversely with respect to said frame; transverse plate means connected to said frame and adapted to be connected to the vehicle body transversely of the longitudinal axis of said frame for transmitting longitudinal forces between the frame and vehicle body; a pair of end wheel assemblies and an intermediate wheel assembly located therebetween; link means pivotally connected at one end to each end wheel assembly and at an opposite end to said frame for linking said wheel assemblies to said frame and for resisting longitudinal and transverse forces between the end wheel assemblies and said frame; guide means carried by and cooperating with said intermediate wheel assembly and said frame for connecting the latter wheel assembly to said frame while providing slidable engagement between said frame and intermediate wheel assembly; a plurality of relatively hard primary spring means associated with each of said wheel assemblies and supporting said frame on said wheel assemblies, respectively; relatively soft secondary spring means connected to said frame and adapted to support the body on said frame, said secondary spring means being located in the region of said intermediate wheel assembly and being laterally spaced from said longitudinal axis farther than said primary spring means; and means connecting each wheel assembly to said frame for resisting turning of said wheel assembly with respect to said frame and including a spring unit pivotally carried by said frame for turning movement about a horizontal axis extending transversely of the frame, the latter horizontal axis being located at the same elevation as the connection of said link means to said frame.

4. In a railway truck, in combination, an elongated frame means having a longitudinal axis of symmetry extending in the direction of travel of the truck; a pair of end wheel assemblies and an intermediate wheel assembly located therebetween, each of said assemblies including a pair of coaxial wheels and an elongated axle extending therebetween; means for interconnecting said end wheel assemblies with said frame and including shaft means fixed to and extending transversely of said frame means, link means operatively connected to each of said end wheel assemblies and extending with one end thereof toward one of said shaft means, and bearing means turnably mounted on said shaft means and connected to said one end of said link means respectively and including a pre-stressed springy rubber insert interconnected with the respective bearing means; guide means carried by and cooperating with said intermediate wheel assembly and said frame for connecting said intermediate wheel assembly to said frame while providing slidable movement between said intermediate wheel assembly and said frame, said guide means also including a pre-stressed springy rubber insert operatively connected therewith, and the spring characteristic of all of said rubber inserts being identical so that all of said rubber inserts are stressed to substantially the same extent when the truck starts to move.

5. In a railway vehicle, as recited in claim 1, said elongated truck frame having a pair of opposed longitudinal side portions and a plurality of transverse portions extending between and fixed to said side portions, said end wheel assemblies each including a pair of wheels and an axle extending therebetween and said frame having end portions extending over the axles of said end wheel assemblies and between the wheels thereof, a pair of said transverse portions of said frame being located at the ends thereof beyond said axle of said end wheel assemblies and a second pair of said transverse portions of said frame being located between the pair of axles of said end wheel assemblies.

6. In a railway vehicle as recited in claim 1, said elongated truck frame including a pair of opposed longitudinal side portions and said frame having a pair of laterally projecting portions located between the ends of and projecting laterally from said longitudinal side portions thereof, respectively, and said secondary spring means being carried by said frame at said laterally projecting portions thereof, each of said laterally projecting portions of said frame including a pair of longitudinally extending parallel walls spaced from each other, said secondary spring means including an elongated longitudinally extending leaf spring assembly located between each of said pairs of walls and adapted to be directly connected with the vehicle body, a pair of coil springs resting on each lateral projection of said frame means over each end of said leaf spring assemblies and bridging the space between the pair of walls of each lateral projection of said frame means, the ends of said leaf spring assembly being respectively suspended from said pairs of coil springs.

7. In a railway vehicle as recited in claim 1, each of said wheel assemblies including an axle, torsion-resistant means connecting each axle to said frame means and including a pair of side plates extending longitudinally of said frame means and having free ends distant from the axle to which they are connected and an intermediate plate extending between and connected to the free ends of said pair of side plates, a pair of annular rubber elements respectively engaging the opposite faces of said intermediate plate, a housing in which said pair of annular elements and intermediate plate are located, and bearing means connecting the housing to said frame means for turning movement with respect to the latter about a horizontal axis extending transversely of said frame means.

8. In a railway vehicle, in combination, three wheel assemblies equidistantly located with respect to each other and including a pair of end wheel assemblies and an intermediate wheel assembly located therebetween, each of said assemblies including a pair of wheels and an axle extending therebetween, said axles being parallel to each other and spaced equidistantly from each other; elongated frame means having a longitudinal axis of symmetry extending longitudinally with respect to the direction of travel of the vehicle and having end portions located over the axles of the pair of end wheel assemblies; a pair of links pivotally connected with the axles of each end wheel assembly and extending from the latter toward said intermediate wheel assembly; means pivotally connecting the ends of said links distant from said axles of said end wheel assemblies to said frame for turning movement with respect to the latter about a pair of transverse horizontal axes, respectively, located at the same elevation as said axles of said end wheel assemblies; guide means carried by said intermediate wheel assembly and said frame means for guiding said intermediate wheel assembly for movement with said frame means while providing slidable engagement between said frame means and intermediate wheel assembly; plate means extending transversely of said frame means and operatively connected with the latter and adapted to be connected to a body of said vehicle for transmitting longitudinal forces between the body and said frame means; lever means located at the elevation of said axles and operatively connected with said frame means and adapted to be connected to the vehicle body for transmitting transverse forces therebetween; a plurality of primary spring means associated with each of said wheel assemblies and supporting said frame means on said wheel assemblies, respectively; secondary spring means softer than said primary spring means connected to said frame means and adapted to support the body on said frame, said secondary spring means being located in the region of said intermediate wheel assembly and being laterally spaced from said longitudinal axis farther than said primary spring means; transmission means including a housing and operatively connected with each of the axles of said wheel assemblies; and means connecting each of said housings with said frame means for preventing turning of said housings about said axles, respectively.

9. In a railway vehicle, in combination, elongated truck frame means having a longitudinal axis of symmetry extending in the direction of travel of the vehicle; a pair of end wheel assemblies and an intermediate wheel assembly; link means pivotally connected at one end to each end wheel assembly and at an opposite end to said frame means for linking said end wheel assemblies to said frame means and for resisting longitudinal and transverse forces between said end wheel assemblies and said frame means; guide means carried by and cooperating with said intermediate wheel assembly and said frame means for connecting said intermediate wheel assembly to said frame means while providing slidable engagement between said frame means and said intermediate wheel assembly; and spring means supporting said frame means on said wheel assemblies, respectively.

10. In a railway vehicle, in combination, elongated truck frame means having a longitudinal axis of symmetry extending in the direction of travel of the vehicle; a pair of end wheel assemblies and an intermediate wheel assembly; link means pivotally connected at one end to each end wheel assembly and at an opposite end to said frame means for linking said end wheel assemblies to said frame means and for resisting longitudinal and transverse forces between said end wheel assemblies and said frame means; guide means carried by and cooperating with said intermediate wheel assembly and said frame means for connecting said intermediate wheel assembly to said frame means while providing slidable engagement between said frame means and said intermediate wheel assembly; spring means supporting said frame means on said wheel assemblies, respectively; and means connecting each wheel assembly to said frame means for resisting turning of said wheel assemblies with respect to said frame means and including a spring unit pivotally carried by said frame means for turning movement about a horizontal axis extending transversely of said frame means.

11. In a railway vehicle, in combination, elongated truck frame means having a longitudinal axis of symmetry extending in the direction of travel of the vehicle; a pair of end wheel assemblies and an intermediate wheel assembly, each of said wheel assemblies including a pair of wheels and an axle extending therebetween, said axles being parallel to each other and spaced equidistantly from each other; a pair of links pivotally connected with the axle of each end wheel assembly and extending from the latter toward said intermediate wheel assembly; means pivotally connecting the ends of said links distant from said axles of said end wheel assemblies to said frame means for turning movement with respect to the latter about a pair of transverse horizontal axes, respectively, located at the same elevation as said axles of said end wheel assemblies; guide means carried by and cooperating with said intermediate wheel assembly and said frame means for connecting said intermediate wheel assembly to said frame means while providing slidable engagement between said frame means and said intermediate wheel assembly; spring means supporting said frame means on said wheel assemblies respectively; and a plurality of transmission means mounted on said frame means, one for each axle of said wheel assemblies and each operatively connected to the respective axle.

12. In a railway vehicle, in combination, elongated truck frame means having a longitudinal axis of symmetry extending in the direction of travel of the vehicle; a pair of end wheel assemblies and an intermediate wheel assembly, each of said wheel assemblies having at least one axle, all of which are located at a predetermined elevation; spring means supporting said frame means on said wheel assemblies; and lever means located substantially at said predetermined elevation and being operatively connected to said frame means at said elevation on opposite sides of the axle of said intermediate wheel assembly and adapted to be connected to a body of said vehicle at points located at said longitudinal axis of symmetry for transmitting between said frame means and vehicle body forces directed transversely to said frame means, said lever means being formed with a cutout through which said axle of said intermediate wheel assembly freely extends.

13. In a railway vehicle, in combination, elongated truck frame means having a longitudinal axis of symmetry extending in the direction of travel of the vehicle; a pair of end wheel assemblies and an intermediate wheel assembly, each of said wheel assemblies having at least one axle, all of which are located at a predetermined elevation; spring means supporting said frame means on said wheel assemblies; and lever means located substantially at said predetermined elevation and being operatively connected to said frame means and adapted to be connected to a body of said vehicle for transmitting between said frame means and vehicle body forces directed transversely to said frame means, said lever means including a pair of elongated links each pivotally adapted to be connected at one end to said vehicle body for turning movement with respect to the latter about a different vertical axis, the pair of vertical axes being located in a vertical plane which includes said longitudinal axis of symmetry of said frame means, a pair of bell cranks pivotally carried by said frame means for turning movement about a pair of vertical axes respectively located on opposite sides of the axle of the intermediate wheel assembly, said cranks being located on the same side of said vertical plane and each crank including a longitudinal arm extending longitudinally of the frame means and a transverse arm extending transversely of said frame means, said longitudinal arms of said cranks being respectively connected pivotally with the other ends of said links, and elongated link means extending longitudinally of said frame means and interconnecting the ends of the transverse arms of said bell cranks, said longitudinal link means being formed with a cutout through which the axle of said intermediate wheel assembly freely extends.

References Cited in the file of this patent

UNITED STATES PATENTS

| | | |
|---|---|---|
| 598,449 | Taylor | Feb. 1, 1898 |
| 846,846 | Harris | Mar. 12, 1907 |
| 1,196,462 | Kadel | Aug. 29, 1916 |
| 1,241,375 | Hankins | Sept. 25, 1917 |
| 1,347,887 | Barber | July 27, 1920 |
| 2,472,160 | Krotz | June 7, 1949 |
| 2,545,956 | Julien | Mar. 20, 1951 |
| 2,885,970 | Heumann | May 12, 1959 |

FOREIGN PATENTS

| | | |
|---|---|---|
| 1,057,459 | France | Oct. 28, 1953 |
| 785,634 | Great Britain | Oct. 30, 1957 |